US011015520B2

(12) United States Patent
Hoffmann

(10) Patent No.: US 11,015,520 B2
(45) Date of Patent: May 25, 2021

(54) SHIP DRIVE SYSTEM AND RETROFITTING METHOD FOR A SHIP DRIVE SYSTEM

(71) Applicant: Fuelsave GmbH, Walldorf (DE)

(72) Inventor: Dirk Hoffmann, Buchholz i.d.N. (DE)

(73) Assignee: FUELSAVE GMBH, Walldorf (DE)

( * ) Notice: Subject to any disclaimer, the term of this patent is extended or adjusted under 35 U.S.C. 154(b) by 0 days.

(21) Appl. No.: 16/981,862

(22) PCT Filed: Mar. 18, 2019

(86) PCT No.: PCT/EP2019/056720
§ 371 (c)(1),
(2) Date: Sep. 17, 2020

(87) PCT Pub. No.: WO2019/179950
PCT Pub. Date: Sep. 26, 2019

(65) Prior Publication Data
US 2021/0040884 A1 Feb. 11, 2021

(30) Foreign Application Priority Data

Mar. 20, 2018 (EP) .................................. 18162732

(51) Int. Cl.
*F02M 43/00* (2006.01)
*F02B 43/12* (2006.01)
(Continued)

(52) U.S. Cl.
CPC .............. *F02B 43/12* (2013.01); *B63B 83/30* (2020.01); *B63H 21/14* (2013.01); *C25B 1/04* (2013.01);
(Continued)

(58) Field of Classification Search
CPC ........ B63H 21/00; B63H 21/38; B63H 21/14; F02B 61/045; F02B 43/04;
(Continued)

(56) References Cited

U.S. PATENT DOCUMENTS 3,885,394 A * 5/1975 Witt ........................ B63H 21/00
60/651
4,161,657 A * 7/1979 Shaffer, Jr. ............. F02M 25/12
290/1 R
(Continued)

FOREIGN PATENT DOCUMENTS

DE   202007011214 U1   2/2008
EP       2438982 A1   4/2012
EP       3124781 A1   2/2017

OTHER PUBLICATIONS

International Search Report for PCT Application No. PCT/EP2019/056720, dated May 23, 2019, 6 pages.

*Primary Examiner* — George C Jin
*Assistant Examiner* — Teuta B Holbrook
(74) *Attorney, Agent, or Firm* — Hoffman Warnick LLC

(57) ABSTRACT

A ship propulsion system comprises at least one internal combustion engine with a combustion chamber for burning a fuel and a turbocharger with a compressor in an intake tract of the internal combustion engine. The ship propulsion system further comprises an electrolysis device, which produces hydrogen and oxygen gas, which are added on a pressure side of the compressor and conducted to the internal combustion engine. Moreover, a water tank and an alcohol tank are connected to a pressure side of the compressor in order to add water and alcohol to the charge air.

15 Claims, 1 Drawing Sheet

(51) Int. Cl.
| | |
|---|---|
| *B63H 21/14* | (2006.01) |
| *F02M 35/10* | (2006.01) |
| *F02M 25/028* | (2006.01) |
| *F02M 31/20* | (2006.01) |
| *F02M 25/12* | (2006.01) |
| *F02D 19/06* | (2006.01) |
| *B63B 83/30* | (2020.01) |
| *C25B 1/04* | (2021.01) |
| *F02M 27/04* | (2006.01) |
| *F02B 43/10* | (2006.01) |

(52) U.S. Cl.
CPC ..... *F02D 19/0644* (2013.01); *F02D 19/0655* (2013.01); *F02M 25/028* (2013.01); *F02M 25/12* (2013.01); *F02M 27/04* (2013.01); *F02M 31/20* (2013.01); *F02M 35/10157* (2013.01); *F02M 35/10209* (2013.01); *F02M 35/10242* (2013.01); *F02B 2043/106* (2013.01)

(58) Field of Classification Search
CPC .... F02B 2043/106; F02B 37/00; F02D 19/02; F02D 19/0671; F02D 19/08; F02D 19/0655; F02M 21/02; F02M 37/32; F02M 21/0206; F02M 21/0215; Y02T 10/12; Y02T 10/30
See application file for complete search history.

(56) References Cited

U.S. PATENT DOCUMENTS

| | | | | |
|---|---|---|---|---|
| 7,401,578 | B2* | 7/2008 | Otterstrom | F02G 5/04 123/3 |
| 2006/0179819 | A1* | 8/2006 | Sullivan | F01N 5/025 60/275 |
| 2006/0179820 | A1* | 8/2006 | Sullivan | F01N 3/18 60/275 |
| 2008/0010993 | A1* | 1/2008 | Morgenstern | F02M 25/12 60/780 |
| 2010/0175638 | A1* | 7/2010 | Haase | F02B 47/02 123/3 |
| 2011/0017874 | A1* | 1/2011 | Haase | F01K 25/005 244/172.2 |
| 2011/0297115 | A1* | 12/2011 | Galindo | F02B 37/24 123/1 A |
| 2013/0255596 | A1* | 10/2013 | Mingilino | C25B 1/06 123/3 |
| 2015/0040848 | A1* | 2/2015 | McAlister | F02B 47/04 123/1 A |
| 2018/0216579 | A1* | 8/2018 | Hoffmann | F02D 21/00 |
| 2020/0400022 | A1 | 12/2020 | Hoffmann | |

* cited by examiner

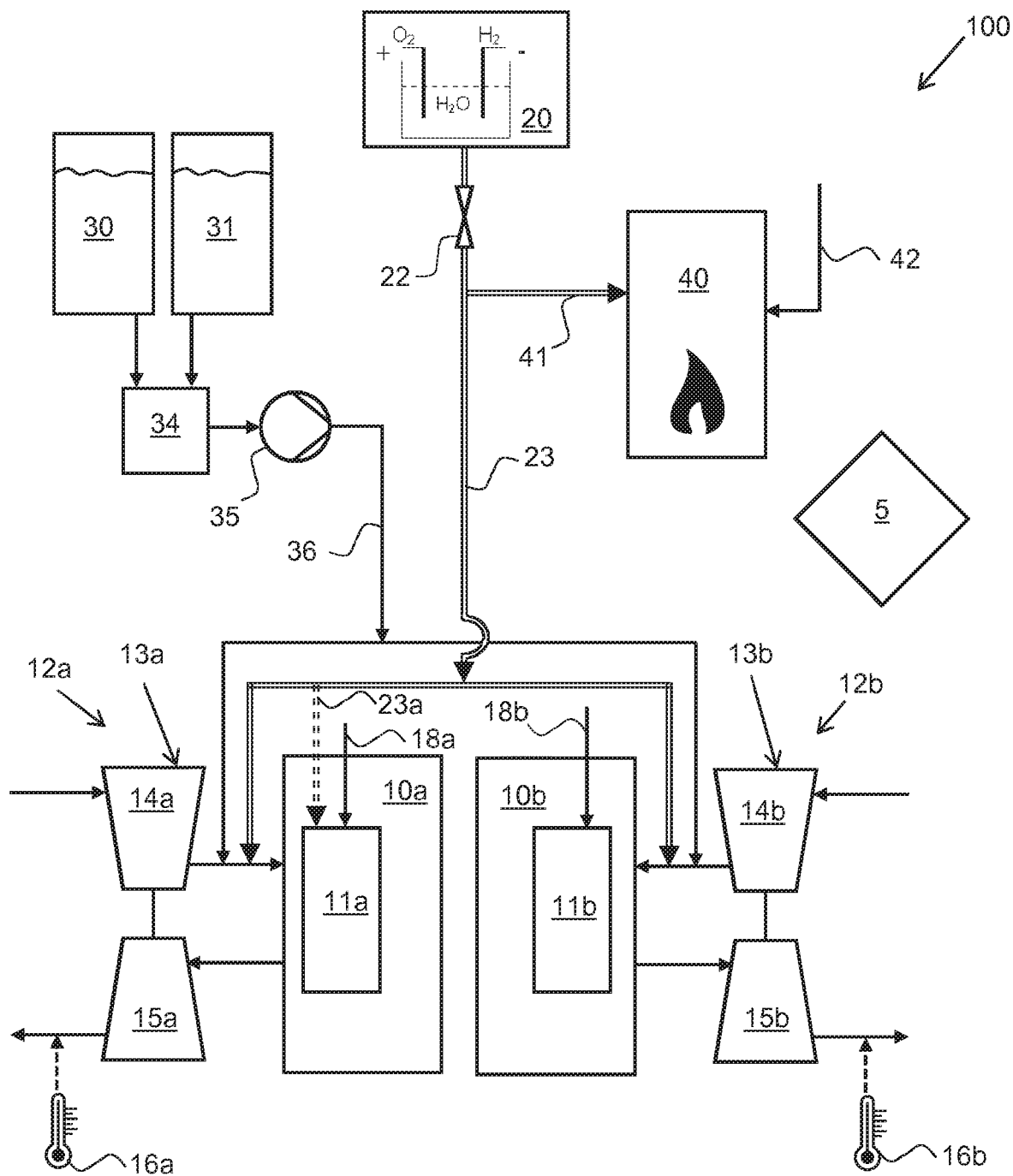

SHIP DRIVE SYSTEM AND RETROFITTING METHOD FOR A SHIP DRIVE SYSTEM

FIELD OF THE INVENTION

The present invention relates to a retrofitting method for a ship propulsion system. The invention further relates to a ship propulsion system and a method for operating a ship propulsion system.

RELATED ART

Ship propulsion systems typically comprise a main engine as well as auxiliary engines, which burn a fuel, for example heavy oil, diesel, gasoil or gas. As environmental standards rise, the regulations stipulated for emissions arising during the combustion of this fuel are becoming stricter and stricter. In addition to the pursuit of a lower level of noxious exhaust substances, a further general goal lies in the improvement of the efficiency of the propulsion system of a ship in order to facilitate an operation that is as economical and fuel-economical as possible.

SUMMARY OF THE INVENTION

The retrofitting method of the invention relates to a ship propulsion system with at least one internal combustion engine comprising a combustion chamber for burning a fuel, an intake tract for supplying fresh air to the combustion chamber and a turbocharger with a compressor in the intake tract. The internal combustion engine or engines can constitute a main engine, an auxiliary engine or a part of the same.

Accordingly, a generic ship propulsion system, upon which the present invention is based, comprises at least one internal combustion engine with a combustion chamber for burning a fuel, an intake tract for supplying fresh air to the combustion chamber and a turbocharger with a compressor in the intake tract. Ship propulsion systems as developed by the Applicant are described, for example, in EP 3124781 B1, and additionally comprise an electrolysis device for producing hydrogen and oxygen gas for the internal combustion engine as well as an alcohol tank for supplying alcohols to the internal combustion engine. By adding hydrogen and oxygen gas as well as alcoholic compounds, the combustion process of the fuel can be influenced in an advantageous manner, whereby in particular less soot is produced and a combustion can be more complete.

Analogously, a generic method for operating a ship propulsion system comprises the following steps:
burning a fuel in a combustion chamber of an (internal) combustion engine,
supplying fresh air via an intake tract to the combustion chamber,
compressing the fresh air by means of a compressor of a turbocharger in the intake tract,
producing hydrogen and oxygen gas for the internal combustion engine by means of an electrolysis device, and
supplying alcohols from an alcohol tank to the internal combustion engine.

EP 2 438 982 A1 describes a system in which a methanol-water mixture is introduced into the intake air of an internal combustion engine. The methanol is produced with hydrogen gas obtained through electrolysis. DE 20 2007 011 214 U1 describes an internal combustion engine in which a mixture produced from fuel and water is injected into the combustion chamber.

It can be considered an object of the invention to specify a ship propulsion system, a method for operating as well as a method for retrofitting a ship propulsion system, which render a particularly efficient and low-emission ship propulsion possible.

This object is achieved by means of the ship propulsion system and the methods according to various embodiments. Advantageous variants of the ship propulsion system in accordance with the invention and of the methods in accordance with the invention are the object of the claims and are also elucidated in the following description.

In accordance with the invention, in the aforementioned retrofitting method for a ship propulsion system, an electrolysis device for producing hydrogen and oxygen gas connected to a pressure side of the turbocharger/compressor is provided. A water tank and an alcohol tank are further provided, which are also connected to the pressure side of the turbocharger/compressor.

Similarly, the aforementioned generic ship propulsion system comprises, in accordance with the invention, a water tank, wherein the water tank and the alcohol tank are connected to a pressure side of the turbocharger/compressor so that water and alcohol can be supplied at this point. The electrolysis device is also connected to the pressure side of the turbocharger/compressor.

Correspondingly, it is provided in accordance with the invention in the aforementioned method for operating a ship propulsion system that the alcohols and water are supplied from a water tank on a pressure side of the compressor. Hydrogen and oxygen gas of the electrolysis device are also supplied on the pressure side of the compressor.

By introducing water (or an aqueous solution from the water tank) and alcohol in liquid form into the intake tract downstream of the turbocharger, the intake air is cooled. Larger quantities of air can thus be conveyed into the combustion chamber. Moreover, an ignition can occur earlier in the cycle and last longer, whereby power output increases. The combustion process is influenced in an advantageous manner, whereby less soot arises.

By adding hydrogen gas, oxygen gas and alcohol behind the turbocharger, there is an increase in safety in comparison with an addition before the turbocharger: these additives can ignite and the flame spread in the event of a backfiring from the combustion chamber. If the additives are first added on the pressure side of the turbocharger, it is unlikely that flames spread beyond the compressor of the turbocharger. Flames could otherwise spread beyond the compressor into a surrounding engine room, which, in order to take in fresh air, is not shielded by a solid wall. A further safety advantage results from the fact that, when the (internal) combustion engine is shut down, practically no flammable gas remains in the intake tract, as practically all additives introduced in the pressure area of the intake tract are conveyed to the combustion chamber before they are able to condense. As a further advantage, the hydrogen and oxygen gas introduced on the pressure side of the turbocharger is subjected to a pronounced swirl, whereby a thorough mixing and an even distribution to all motor units or cylinders following the turbocharger is achieved.

The water tank and the alcohol tank can be connected to the pressure side of the turbocharger via a mixing container. A mixture of water and alcohol is thus produced, which is then injected into the intake tract with a pressure pump downstream of the turbocharger. By forming a mixture first, merely a single pressure pump is required. This results in significant cost savings, as the pressure pump and the alcohol tank generally have to be explosion-proof and meet higher safety standards. The pressure pump can be configured to produce a pressure that is higher than a pressure of the turbocharger. This is expedient in order to be able to inject the water-alcohol mixture into the pressure area behind the turbocharger. In principle, the water tank and the alcohol tank can also be formed by a common tank in which a mixture, in particular an emulsion, of water and alcohol is held. Separate tanks leading to a mixing container, however, have the advantage that a mixing ratio between the water and the alcohol can be varied. Moreover, the problem of the long-term stability of emulsions can be avoided by means of a mixing container.

An (electronic) control unit can be provided and configured to variably set the water-alcohol mixture ratio in the mixing container, i.e. the amount of water from the water tank and the amount of alcohol from the alcohol tank introduced into the mixing container can be set in a variable manner.

Alternatively or additionally, the control unit can be configured to variably set a ratio between the electrolysis gases and water and alcohol supplied to the internal combustion engine. Depending on the design of the electrolysis device, oxygen gas and hydrogen gas are used together as electrolysis gases (in a fixed ratio in relation to one another) or oxygen gas and hydrogen gas are drawn separately from the electrolysis device so that a ratio between the two can be varied.

The control unit can comprise a data interface for receiving a fuel signal indicating what kind of fuel is currently being supplied to the internal combustion engine. With respect to the fuel, a distinction can be made, for example, between heavy oil, gasoil, gas or diesel oil. Depending on the maritime region in which the ship is travelling, a replacement of the fuel can be provided. The ratio as well as the amounts in which the electrolysis gases, water and alcohol are to be supplied depend on the fuel currently being burned. The control unit can consequently be configured to vary the ratio between the electrolysis gases and water and alcohol depending on the fuel signal.

Alternatively or additionally, further parameters can be received via the data interface, depending on which the control unit changes the ratio between the electrolysis gases and water and alcohol. In particular, an exhaust-gas temperature sensor can be provided and the control unit varies the ratio between the electrolysis gases and water and alcohol depending on a measured exhaust gas temperature. A higher exhaust gas temperature indicates that the charge air (i.e. the air compressed by the turbocharger) can be cooled to a greater extent. The control unit can thus in particular be configured to add more alcohol and/or water in the event of a higher exhaust temperature. A finer adjustment is possible by means of further temperature sensors. For example, a temperature in the engine room in which the internal combustion engine is located can be taken into account.

The electrolysis device can be designed cost-efficiently so that hydrogen gas and oxygen gas are drawn together and transported via the same pipe. This can signify relevant cost benefits in light of the high safety requirements concerning pipe supply lines in explosion-proof areas on ships, as described further down in greater detail. Alternatively, the electrolysis device can be designed so that hydrogen gas and oxygen gas are conveyed via separate lines. In this case, advantageously, a or the control unit can be configured to also variably set a ratio between the hydrogen gas and the oxygen gas supplied to the internal combustion engine.

A charge-air cooler which cools the charge air on the pressure side of the turbocharger can be provided. In principle, better results can be achieved when, instead of the cooling by means of the charge-air cooler, a cooling by means of the addition of the alcohol-water mixture occurs. A or the control unit can consequently be configured to control a cooling output of the charge-air cooler depending on and in particular inversely to an amount of added alcohol and water. The control of the charge-air cooler can occur, for example, via a control valve, which throttles as a function of power output, or via a speed control of a pump of the charge-air cooler. It can be provided that the charge-air cooler is only operated at a maximum cooling output when there is no water-alcohol mixture being supplied to the internal combustion engine. This can be the case, for example, when the components required for the water-alcohol supply are disabled for maintenance. An operating temperature of the internal combustion engine should not become too low either, as there is otherwise a risk of condensation in the engine. If a cooling output is to be reduced for this reason, it can be provided that the charge-air cooler is shut down and not the water-alcohol supply.

Due to the high safety requirements on ships, it is not permitted to use single-walled pipes for substances with a low flash point. Double-walled metal pipes, however, represent significant additional costs, in particular in cases where there are curved doubled-walled pipe areas. Considerable cost savings can be achieved when a water-alcohol supply pipe connecting the mixing container to the pressure side of the turbocharger is double-walled with an outer metal pipe and an inner tube. Likewise or alternatively, a supply pipe from the alcohol tank and one or more supply pipes for the electrolysis gases can be formed in this manner. The tube can be made of plastic or some other non-metallic material. It is flexible and pliable so that an introduction into the outer metal pipe is readily possible. A vacuum or negative pressure can be generated between the outer metal pipe and the inner tube, wherein a pressure sensor can infer a tube leakage in the event of a change in pressure. In contrast, it can also be advantageous to use a protective gas (for example nitrogen) between the outer metal pipe and the inner tube, wherein its pressure is in particular higher than atmospheric pressure. A control unit can control the pressure pump so that a pressure in the water-alcohol supply pipe is higher than the pressure of the protective gas by a predetermined minimum value, for example at least 1 bar. In comparison with a negative pressure, the protective gas provides a counter-pressure against the tube, whereby the permeability of the latter is reduced. Moreover, a higher pressure of the protective gas promotes a condensing of any permeating water-alcohol mixture, which can be collected and detected in condensed form in a lower catch area or siphon. This can potentially be more reliable than a pressure sensor.

The more fuel (for example, heavy oil) is burned by the internal combustion engine, the more electrolysis gases should be added. The size of the electrolysis device is financially significant so that an ideal size of the electrolysis device for the internal combustion engine(s) to be supplied should be provided. In principle, the dimensions of the electrolysis device can be determined so that an increasing amount of electrolysis gases can be produced and added up to a full-load operation of the internal combustion engine. Internal combustion engines of ships, however, are generally capable of considerably greater power outputs than required under normal circumstances for safety reasons. It is consequently only very seldom that propulsion systems of ships are operated at more than 85% of a maximum power output (full load). It is thus sufficient to configure the dimensions of the electrolysis device so that its maximum output of electrolysis gases supplied to the internal combustion engine(s) is already reached at 85% (or more generally at a value between 70% and 90%) of the maximum power output. This way, the electrolysis device can be designed to be smaller without any loss of efficiency occurring during normal operation. In this embodiment, the control unit can be configured to receive an indication of the current power output of the internal combustion engine via its data interface and to increase a setting for an amount of hydrogen gas and oxygen gas supplied to the internal combustion engine in proportion to the magnitude of the indicated current power output. The dimensions of the electrolysis device are configured here so that the control unit sets a maximum producible amount of hydrogen gas and/or oxygen gas already when a power output threshold is reached, which designates a partial load that lies between 70% and 90% of a full-load operation of the internal combustion engine.

In the case of an auxiliary diesel engine, the indicated power output can generally be ascertained directly at the engine. In the case of a main engine, a sensor registers how much power is transmitted into the water at the propeller shaft. Together with the knowledge of a power output by a shaft generator of the main engine, the current load operation of the internal combustion engine can be calculated.

In order to introduce hydrogen and oxygen gas from the electrolysis device into the pressure area behind the turbocharger, a pressure of the hydrogen and oxygen gas must be higher than a charge-air pressure in the pressure area. A pressure pump for this purpose, however, would be very costly, as only the use of explosion-proof pumps is permitted due to the flammability of the hydrogen gas. It may thus be preferred to use the electrolysis device for building up pressure. The electrolysis device or its cells are thus formed as pressure chambers, i.e. as closed containers in which the produced electrolysis gases increase the pressure. At least one control valve can be connected to an outlet of the electrolysis device for oxygen and/or hydrogen gas, wherein the control valve only opens a connection to the pressure side of the turbocharger when a pressure in the electrolysis device exceeds a settable opening pressure. The control unit can set the opening pressure as a function of the charge-air pressure behind the turbocharger, for example always so that the opening pressure is higher than the charge-air pressure by a threshold value (of e.g. 0.5 bar).

Typically, a plurality of internal combustion engines, which can be a main engine and/or one or more auxiliary engines of the ship, are provided. As it can be varied, for example depending on the region, whether the main engine or the auxiliary engines are operated to a greater extent, it can be advantageous if the electrolysis device and the water-alcohol supply serve the main engine or the auxiliary engines in a selective manner. In such an embodiment variant, the electrolysis device and the mixing container (or the water tank and the alcohol tank) are connected to both the main engine as well as to the auxiliary engines. A or the control unit can variably set whether the hydrogen gas, oxygen gas, water and alcohol are supplied to the main engine and/or the auxiliary engines, wherein a ratio between the supplied hydrogen gas, oxygen gas, water and alcohol is varied depending on whether the main engine or the auxiliary engines are being supplied. Particularly in view of the fact that the main and auxiliary engines are typically operated with different fuels, better combustion results can be achieved if the control unit changes a ratio and an amount of the supplied substances depending on which internal combustion engine is to be supplied.

It is possible with different internal combustion engines that the corresponding turbochargers generate different charge pressures. For this scenario, the control unit may configured to set the opening pressure of the control valve as a function of the highest charge pressure so that the opening pressure is also greater than the highest charge pressure by a predetermined minimum value. An electrolysis gas line can fork downstream of the control valve to the pressure areas of the plurality of internal combustion engines and respectively have a settable throttle by means of which a pressure of the electrolysis gases can be reduced to a value suitable for the relevant charge pressure.

The intake tract may be understood as a line or a supply line system that conducts air to the combustion chamber. A common intake tract can supply one or more combustion chambers or internal combustion engines with air. The supplied air comprises fresh air, i.e. ambient air, and can comprise further components. The turbocharger comprises a compressor, which increases an air pressure in the intake tract; the entire area downstream of the turbocharger up to the combustion chamber is called the pressure side. The turbocharger further comprises an exhaust gas turbine, which is driven by an exhaust gas pressure of the internal combustion engine and which drives the compressor by this means. As the exact manner of operation of the turbocharger is not important here, a compressor can also be used in the intake tract instead of the turbocharger. A device of any design which splits a starting material using electric energy can be considered an electrolysis device. The starting material here can be water, by which an aqueous solution is to be understood. By means of the electrolysis, hydrogen and oxygen gas are produced. These electrolysis gases are introduced on the pressure side of the turbocharger, i.e. in the intake tract or directly into the combustion chamber. Structural modifications of the cylinder forming the combustion chamber are complex and generally expensive; dual-fuel engines, however, provide an extra port, which is not used for supplying fuel by some operators. In this case, the extra port in the cylinder cover of a dual-fuel engine can be repurposed and connected to the electrolysis device. In order to render possible a supply of electrolysis gases in any engine without significant modifications, it can be more economical to introduce the electrolysis gases into an air supply pipe of the intake tract. A container with in principle any alcohol, for example methanol and/or ethanol, is understood by alcohol tank. If the alcohol is first mixed with water, merely a single pressure pump and a single nozzle to the intake tract are necessary for the mixture. If the cylinders of the internal combustion engine are further apart, which is, for example, frequently the case in a main engine, a plurality of nozzles/points of entry for the water-alcohol mixture as well as a plurality of nozzles for the electrolysis gases into the intake tract can be provided. Further tanks can also be connected to the mixing container in order to add further additives in a variable manner. In addition, further additives can also be added into the water tank and the alcohol tank.

Ships typically use waste heat of the internal combustion engines of the main or auxiliary engines for the purpose of heating, for example, rooms or water. The main and auxiliary engines typically run at low speeds in particular during port operation, so that an insufficient amount of waste heat is created. For this reason, a boiler can be provided, which burns a fuel for heating purposes. The fuel is introduced via a fuel line from a fuel tank and can be, for example, heavy oil, marine diesel, gas oil or gas. This combustion typically gives rise to large amounts of soot, which is not only detrimental from an environmental perspective, but also leads to deposits in the boiler, whereby the producible heat output sinks. Boilers are thus generally designed to be larger than necessary and have to be cleaned or replaced regularly. In principle, it is possible to improve the combustion process of the boiler by means of additives; however, as a consequence of the high safety regulations on ships, for example a separate electrolysis device for the boiler that adds hydrogen gas in small quantities must be protected to an excessively complex degree. The additional costs prohibit such a use. A variant of the invention exploits the insight that the main/auxiliary engines and the boiler are generally not used together, but rather alternatively: On the open sea, the main engine runs mostly at high speeds and produces sufficient waste heat so that the boiler can remain inactive. The main engine is conversely typically shut down during port operation and the boiler is required. Consequently, the same electrolysis device that was described in the foregoing can also be connected to the boiler via a boiler line. The electrolysis device typically does not have to be designed to be larger in order to be able to supply the boiler as well. Merely a single explosion-proof area needs to be formed around the electrolysis device in this scenario, and not, for example, separate protected areas for separate electrolysis devices. A or the control unit can then supply hydrogen gas and/or oxygen gas to the boiler when the latter is burning fuel and a maximum producible amount of hydrogen gas and oxygen gas has not already been allocated to the at least one internal combustion engine. The boiler line can comprise an oxygen line and a hydrogen line separate therefrom. This way, the control unit can set a ratio between the oxygen gas and the hydrogen gas supplied to the boiler depending on a fuel currently being burned in the boiler.

The characteristics of the invention that have been described as additional features of the ship propulsion system also yield, if implemented as intended, variants of the method in accordance with the invention. Variants of the retrofitting method in accordance with the invention result by adding those features of the ship propulsion system in accordance with the invention that have been described as optional.

BRIEF DESCRIPTION OF THE DRAWINGS

Further advantages and features of the invention are described in the following with reference to the attached schematic FIGURE:

FIG. 1 is a schematic representation of an example embodiment of a ship propulsion system in accordance with the invention.

DETAILED DESCRIPTION OF THE INVENTION

FIG. 1 shows an example embodiment of a ship propulsion system 100 in accordance with the invention. The ship propulsion system 100 comprises one or more internal combustion engines 10a, 10b, which are supplied with a (fossil) fuel via respective fuel lines 18a, 18b. The internal combustion engines 10a, 10b can be, for example, units of a main engine, a main engine and one or more auxiliary engines, or units of one or more auxiliary engines of a ship propulsion system 100.

Each internal combustion engine 10a, 10b comprises at least one combustion chamber 11a, 11b as well as an intake tract 12a, 12b, via which fresh air is conducted into the combustion chamber 11a, 11b. Moreover, a turbocharger 13a, 13b is respectively provided, which comprises an exhaust gas turbine 15a, 15b and a compressor 14a, 14b. The exhaust gas turbines 15a, 15b are driven by the pressure of the exhaust gas, which is produced by the combustion of the fuel in the combustion chambers 11a, 11b. The exhaust gas turbines 15a, 15b drive the respective compressors 14a, 14b so that the fresh air is compressed in the intake tract 12a, 12b. This is then called charge air.

The combustion process of the fuel should occur in a manner that is as efficient as possible and produce little emissions/pollutants. For this purpose, electrolytically produced hydrogen and oxygen gas as well as water and alcohol (for example methanol) are supplied, as described in the following in greater detail. Moreover, by means of the design in accordance with the invention, high safety requirements are respected in a cost-efficient manner.

Water and alcohol are drawn from a water tank 31 and an alcohol tank 30 and mixed in a mixing container 34. In particular, the mixing container 34 may simply be a connection between a water pipe and an alcohol pipe, e.g., a Y pipe. A pressure pump 35 subsequently conveys the mixture via a water-alcohol supply pipe 36 into the intake tract 12a, 12b, namely into a pressure area downstream of the compressor 14a, 14b. The introduction behind the compressor 14a, 14b has the advantage in comparison with an introduction before the compressor 14a, 14b that charge air is cooled better and, as a result, the compressor 14a, 14b can convey larger quantities of air. Lower combustion temperatures are further conducive to the reduction of nitrogen oxides, which are produced by the combustion.

By providing separate tanks 30, 31 for water and alcohol, the mixing ratio can be changed in a variable manner. The problem that emulsions of water and alcohol have a limited long-term stability is also circumvented by means of the mixing container 34. A further advantage is that merely a single pressure pump 35 is necessary on account of the mixing container 34. As the alcohol tank 31 as well as supply lines and any pumps transporting the alcohol are subject to high safety requirements due to the high flammability of the alcohol, the fact that a single pressure pump 35 is sufficient represents a relevant cost saving.

In principle, the electrolysis device 20 can comprise any number of electrolysis cells, which decompose water or an aqueous solution into in particular hydrogen gas and oxygen gas using electric energy. The electrolysis gases produced (hydrogen gas and oxygen gas) are supplied via an electrolysis gas line 23 to the intake tract 12a, 12b, likewise in the pressure area behind the compressor 14a, 14b.

A higher safety is achieved by adding the electrolysis gases as well as the water-alcohol mixture downstream of the compressor 14a, 14b. For example, in the event of defects or damage, a backfiring from the combustion chamber 11a, 11b into the intake tract 12a, 12b could occur. Due to the high flammability of alcohol and hydrogen gas, flames could spread further. The intake tract 12a, 12b is open for the intake of fresh air, for example in relation to an engine room where people may be present. The risk of flames spreading via the flammable hydrogen and alcohol into the engine room is reduced significantly on account of the fact that an introduction of these substances only occurs shortly before/ at the combustion chamber and that there is also a separation from the engine room by means of the compressor 14a, 14b. Anti-backfire valves can be added as further protection.

Moreover, for safety reasons, double-walled pipes are required for the alcohol-water pipe 36 and for the electrolysis gas line 23. Double-walled pipes with two metal walls involve high costs. However, as flammability is reduced in particular by the addition of water to the alcohol, it can be sufficient if an outer wall is formed by a metal and an inner wall is formed as a tube by primarily non-metallic materials.

In order to avoid the significant cost of a pressure pump for conveying the electrolysis gas, the electrolysis device 20 can be designed as a pressure chamber. A control valve 22 is provided, which opens an outlet for electrolysis gases only when an opening pressure is reached in the electrolysis device 20 by the produced gases.

The electrolysis gases oxygen and hydrogen can be conveyed together as oxyhydrogen gas in a single supply line. Alternatively, the electrolysis device 20 can be configured in a manner that oxygen gas and hydrogen gas can be drawn separately via separate lines. A control valve can be provided per supply line in this case. Adding oxygen gas and hydrogen gas separately permits a ratio between the two that can be set in a variable manner.

By adding oxygen gas, hydrogen gas, alcohol and water, the efficiency of the combustion can be increased. The ratios between these additives as well as their total amounts are relevant here. Ideal values for these variables depend on different parameters. A control unit 5 is consequently provided, which sets the ratios and amounts of said additives in a variable manner. To this end, the control unit controls the electrolysis device 20, in particular a water supply and/or an electric power consumption of the electrolysis device 20, as well as the pressure pump 35 and the at least one control valve 22. The control unit 5 receives a fuel signal which indicates what kind of fuel is currently being burned in the combustion chambers 11*a*, 11*b*. In the event of a replacement of the fuel, the control unit 5 also changes the ratio of the aforementioned additives. Moreover, an exhaust gas temperature is registered via exhaust-gas temperature sensors 16*a*, 16*b*. The higher the exhaust gas temperature is, the more water and/or alcohol can be injected into the intake tract for cooling purposes. Moreover, the control unit 5 can set how many and which of the internal combustion engines 10*a*, 10*b* are supplied with the additives in a variable manner. As the internal combustion engines 10*a*, 10*b* can differ with respect to their structure, it can also make sense to change the ratio of the additives when different internal combustion engines of the various internal combustion engines are operated.

In an optional additional embodiment, the combustion process of a boiler 40 is also improved. The boiler 40 is supplied with fuel, for example with heavy oil, marine diesel oil or gasoil, via a supply line 42. By adding hydrogen gas and oxygen gas, a more complete combustion can be achieved, in which less soot is generated. A separate electrolysis device for a boiler 40 is hardly viable due to the limited use of the boiler and on account of the high costs of an electrolysis device due to safety requirements. The electrolysis device 20 provided for the internal combustion engines 10*a*, 10*b* can, however, be shared by the boiler 40. The control unit 5 can set the ratio in which produced electrolysis gases are apportioned to the internal combustion engines 10*a*, 10*b* and to the boiler 40. This is also particularly attractive in light of the fact that the operation of the boiler 40 frequently increases in proportion to a decrease in the operation of the internal combustion engines 10*a*, 10*b*. This is explained by the fact that the boiler 40 is required in particular when the internal combustion engines 10*a*, 10*b* do not provide sufficient waste heat. The boiler 40 can thus share the supply of electrolysis gases without a larger or significantly more expensive configuration of the electrolysis device 20 being necessary as a result.

A variant embodiment is shown by the line 23*a*, which is illustrated as a dashed line. Electrolysis gases can be conducted directly into the combustion chamber 11*a* via the line 23*a* instead of being introduced in the intake tract. This can make sense in particular when an otherwise unused port is provided in a cylinder cover of the internal combustion engine 10*a*, 10*b*, which can be the case with dual-fuel engines in which only one of the two ports is used for a fuel supply. Otherwise, an introduction in the intake tract may have the advantage that structural modifications of conventional combustion chambers 11*a*, 11*b* are not required. This permits an inexpensive upgrading of existing generic ship propulsion systems.

The invention claimed is:

1. A retrofitting method for a ship propulsion system, wherein the ship propulsion system comprises at least one internal combustion engine with:
 a combustion chamber for burning a fuel;
 an intake tract for supplying fresh air to the combustion chamber; and
 a turbocharger with a compressor in the intake tract;
the method comprising:
 connecting an electrolysis device configured to produce hydrogen and oxygen gas to a pressure side of the compressor for supplying hydrogen and oxygen gas into the intake tract; and
 connecting a water tank and an alcohol tank to a pressure side of the compressor for supplying water and alcohol into the intake tract.

2. A ship propulsion system comprising:
 at least one internal combustion engine with:
  a combustion chamber for burning a fuel;
  an intake tract for supplying fresh air to the combustion chamber; and
  a turbocharger with a compressor in the intake tract;
 an electrolysis device for producing hydrogen and oxygen gas for the internal combustion engine; and
 an alcohol tank for supplying alcohols to the internal combustion engine;
 a water tank;
 wherein the water tank and the alcohol tank are connected to a pressure side of the compressor for the supply of water and alcohol into the intake tract, and
 wherein the electrolysis device is connected to the pressure side of the compressor for supplying hydrogen and oxygen gas into the intake tract.

3. The ship propulsion system as defined in claim 2, wherein the water tank and the alcohol tank are connected to the pressure side of the turbocharger via a mixing container, and
 the ship propulsion system further comprises a pressure pump between the mixing container and the pressure side of the turbocharger that is configured to generate a pressure that is higher than a pressure of the compressor.

4. The ship propulsion system as defined in claim 3, further comprising:
 a control unit configured to:
  set a water-alcohol mixing ratio in the mixing container in a variable manner,
  variably set a ratio between the electrolysis gases and water and alcohol supplied to the internal combustion engine,
  wherein the control unit comprises a data interface for receiving a fuel signal which indicates what kind of fuel is being supplied to the internal combustion engine; and wherein the control unit is configured to vary the ratio between the electrolysis gases and water and alcohol depending on the fuel signal.

5. The ship propulsion system as defined in claim 4, further comprising:
an exhaust-gas temperature sensor,
wherein the control unit is configured to vary the ratio between the electrolysis gases and water and alcohol depending on an exhaust gas temperature, in particular to add more alcohol and water in the event of a higher exhaust gas temperature.

6. The ship propulsion system as defined in claim 4, further comprising:
a charge-air cooler
wherein the control unit is configured to control a cooling output of the charge-air cooler inversely to an amount of alcohol and water added on the pressure side of the turbocharger.

7. The ship propulsion system as defined in claim 3, wherein:
the electrolysis device is designed in a manner that the hydrogen gas and oxygen gas are conveyed via separate electrolysis gas lines, and
the control unit is also configured to variably set a ratio between the hydrogen gas and oxygen gas supplied to the internal combustion engine.

8. The ship propulsion system as defined in claim 3, further comprising:
a water-alcohol supply pipe that connects the mixing container to the pressure side of the turbocharger and is doubled-walled with an outer metal pipe and an inner tube, and
a protective gas between the outer metal pipe and the inner tube, the pressure of which is higher than atmospheric pressure, wherein a control unit controls the pressure pump so that a pressure in the water-alcohol supply pipe is at least 1 bar higher than the pressure of the protective gas.

9. The ship propulsion system as defined in claim 3, further comprising:
a control unit configured to:
receive an indicated current power output of the internal combustion engine via its data interface,
increase an amount of hydrogen gas and oxygen gas set for the supply to the internal combustion engine in proportion to the magnitude of the indicated current power output,
wherein the electrolysis device is dimensioned so that the control unit sets a maximum producible amount of at least one of hydrogen gas and oxygen gas already at a power output threshold which designates a partial load that lies between 70% and 90% of a full-load operation of the internal combustion engine.

10. The ship propulsion system as defined in claim 3, further comprising:
a control valve connected to an outlet of the electrolysis device for at least one of oxygen and hydrogen gas, wherein the control valve opens a connection to the pressure side of the turbocharger when a pressure in the electrolysis device exceeds a settable opening pressure, and
the control unit is configured to set the opening pressure depending on a charge-air pressure behind the turbocharger.

11. The ship propulsion system as defined in claim 3, further comprising:
a plurality of internal combustion engines, which are a main engine and auxiliary engines of the ship,
the electrolysis device and the mixing container are connected to both the main engine and the auxiliary engines, and
a control unit (5) is configured to:
variably set whether the main engine and/or the auxiliary engines are supplied with the hydrogen gas, oxygen gas, water and alcohol, and
vary a ratio between the supplied hydrogen gas, oxygen gas, water and alcohol depending on whether the main engine or the auxiliary engines are being supplied.

12. The ship propulsion system as defined in claim 11, wherein the turbochargers of the plurality of internal combustion engines provide different charge pressures,
wherein the control unit is configured to set the opening pressure of the control valve depending on the highest charge pressure, and
wherein an electrolysis gas line forks downstream of the control valve to the pressure areas of the plurality of internal combustion engines and a settable throttling is respectively provided.

13. The ship propulsion system as defined in claim 3, further comprising:
at least one boiler for burning a fuel,
a boiler line connecting the electrolysis device to the boiler, and
a control unit configured to supply hydrogen gas and oxygen gas to the boiler when the latter burns fuel and a maximum producible amount of hydrogen gas and oxygen gas has not already been allocated to the at least one internal combustion engine.

14. The ship propulsion system as defined in claim 13, wherein the boiler line comprises an oxygen line and a hydrogen line separate therefrom, and
wherein the control unit is configured to set a ratio between the oxygen gas and hydrogen gas supplied to the boiler depending on a fuel currently being burned in the boiler.

15. A method for operating a ship propulsion system, comprising the following steps:
burning a fuel in a combustion chamber of an internal combustion engine;
supplying fresh air to the combustion chamber via an intake tract;
compressing the fresh air by means of a compressor of a turbocharger in the intake tract;
producing hydrogen and oxygen gas for the internal combustion engine by means of an electrolysis device; and
supplying alcohols from an alcohol tank to the internal combustion engine, wherein the alcohols and water are supplied from a water tank on a pressure side of the compressor; and
wherein the hydrogen and oxygen gas of the electrolysis device are supplied on the pressure side of the compressor.

* * * * *